Patented Jan. 20, 1942

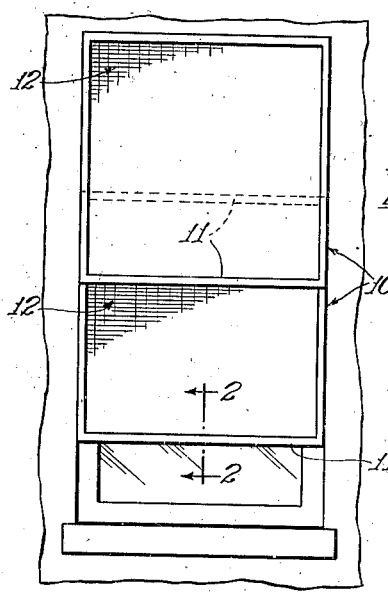
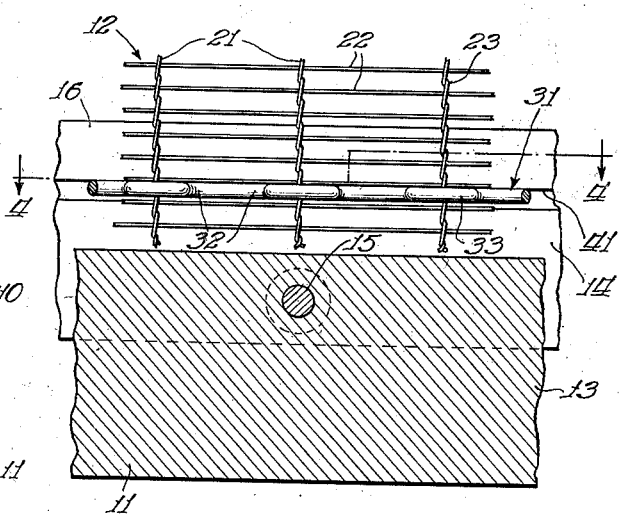
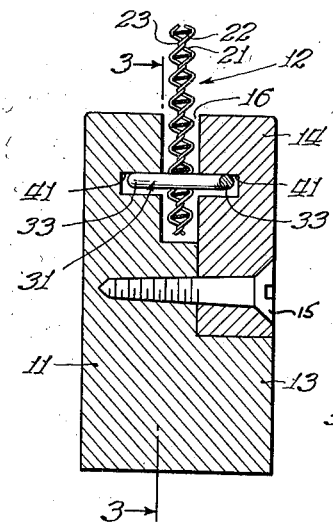
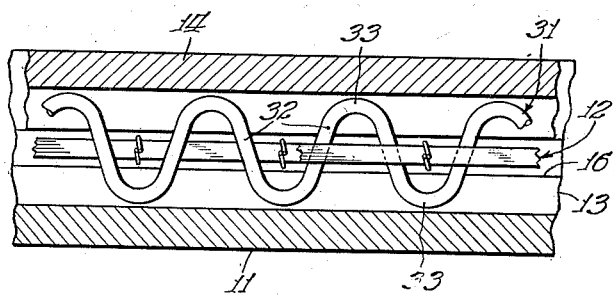
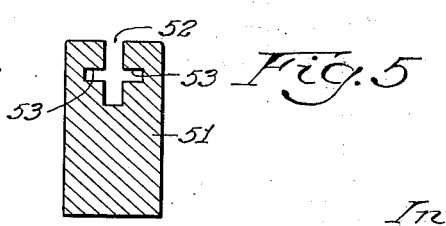

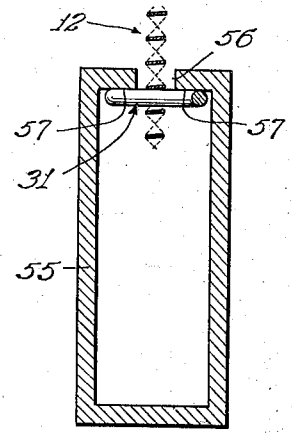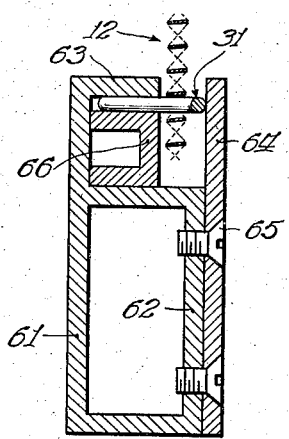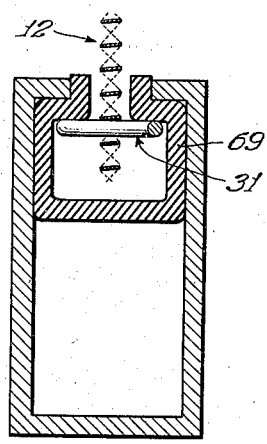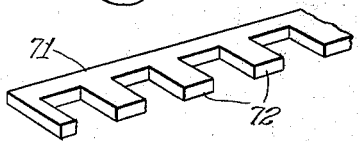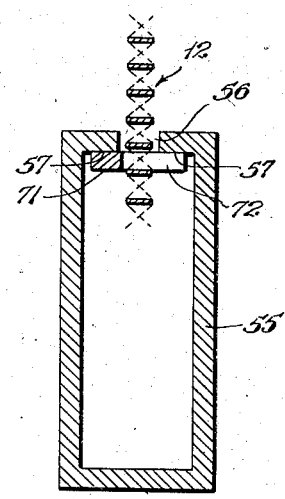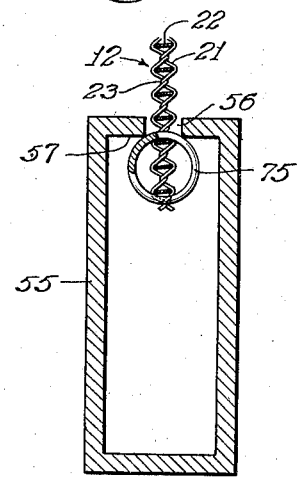

2,270,423

UNITED STATES PATENT OFFICE 2,270,423

SCREEN FRAME LACER RETAINER ASSEMBLY

Walkley B. Ewing, Grand Rapids, Mich., assignor, by mesne assignments, to Borg-Warner Corporation, Chicago, Ill., a corporation of Illinois Application January 26, 1940, Serial No. 315,713

8 Claims. (Cl. 156—14)

This invention relates to screen and frame assemblies, and more particularly to a novel arrangement for retaining the peripheral portion of the screen within an embracing frame.

It is an object of the present invention to provide an improved arrangement for retaining the edge portion of the screen within a recess formed within the supporting frame without substantially distorting the edge.

It is a more specific object to provide an improved construction of end frames and cooperating retainer members for receiving and retaining the end portions of screen of the type including longitudinally extending warp strands and parallel ribbon-like filler strands positioned with their major surfaces at an angle to the plane of the cloth.

It is a further detailed object to provide in an arrangement of the present class for introducing the edge of the screen into the recess of the frame and retaining the same without bending the edge portion of the screen substantially out of the normal plane of the main portion of the screen.

Another more specific object is the provision of an arrangement of the present class wherein screen of the type having ribbon-like transverse filler wires arranged with their major surfaces disposed at a predetermined angle to the plane of the cloth for affording light control as well as optical properties is held substantially straight within the recess of the frame and retained with the edge portion not distorted substantially out of the normal plane of the screen, whereby to cause said screen to retain all of its light control and optical properties in the area adjacent the entry of the screen into the frame as well as in the central portion of the screen.

It is a still further and more detailed object to provide an arrangement affording the above enumerated advantages, together with the further advantage that the screen is maintained under a predetermined tension which is effective to cause the ribbon-like filler members to retain their relative position as well as to return to said relative position when removed therefrom by external forces.

The above and other objects, advantages and uses of my invention will become more apparent from a reading of the following specification and claims, taken in connection with the appended drawings, which form a part of this specification, and wherein:

Fig. 1 is an elevation indicating schematically a window frame installation incorporating my invention;

Fig. 2 is a cross-section taken substantially on the line 2—2 of Fig. 1, and showing one preferred embodiment of my invention;

Fig. 3 is a cross-section taken substantially on the line 3—3 of Fig. 2;

Fig. 4 is a cross-section taken substantially on the line 4—4 of Fig. 3;

Fig. 5 is a cross-section of an alternate frame construction and corresponding to the view shown in Fig. 2;

Fig. 6 is a view corresponding to that of Fig. 2, showing an alternative form of frame construction;

Fig. 7 shows still another alternative form of frame construction;

Fig. 8 shows the form of frame construction indicated in Fig. 6, but incorporating an insulating member;

Fig. 9 shows an alternative form of lacer retainer to that shown in the preceding figure;

Fig. 10 shows still another alternative form of lacer retainer member;

Fig. 11 shows in assembly the form of lacer disclosed in Fig. 9.

Referring to Fig. 1, I have shown an installation in a window frame including relatively slidable upper and lower screen frames 10, each comprising top and bottom frame members 11 supporting therebetween under tension a screen 12.

This invention is particularly concerned with the solution of the problem of retaining the peripheral portions or top and bottom edges of screen 12 within top and bottom frame members 11, while maintaining the screen under tension. This invention has application wherever this tension of the screen is important, particularly wherever it is important to maintain a definite relationship of the parts of the screen by maintaining the screen under predetermined tension. My invention is particularly applicable to the problem of supporting and maintaining definite tension in screen material of the type comprising longitudinally extending pairs of warp wires and parallel transverse ribbon-like filler wires, there being provided integrating twists between the wires of each pair of warp wires, giving to the screen a longitudinal resilience, while at the same time maintaining a definite angular relationship between the major surfaces of the ribbon-like filler members and the plane of the screen when the screen is under a predetermined tension. No claim is herein made to the specific construction of screen cloth, the same being covered by another currently pending application.

Referring in specific detail to the preferred form of my invention shown in Figs. 2 to 4, lower frame member 11 may be of wood or other suitable material and including frame member 13, and closure strip 14, defining therebetween a longitudinal recess 16 opening in the direction of screen 12, and receiving the end portion of the screen therein while the same is maintained in the normal plane of the screen. In other words, the end portion of the screen is held substantially straight within recess 16, and is not bent or otherwise distorted out of its normal plane by wrapping the same about any of the usual forms of filler members. Closure strip 14 is retained on frame member 13 as by means of a plurality of screws 15.

The screen material shown for the purpose of illustrating the novel features of the present invention because of the peculiar properties of this particular screen material is composed of a plurality of pairs of longitudinally extending warp wires 21 and a plurality of spaced parallel ribbon-like filler wires 22 disposed with their major surfaces at a predetermined angle to the plane of the screen and held in this relation by means of integrating twist 23 between the wires of each pair of warp wires at positions located between adjacent ones of said filler wires. Integrating twists 23 are effective to impart longitudinal resilience to the screen and to maintain accurately the angular relationship of the filler wires when the screen is maintained under tension, as well as causing the component parts of the screen to return to their normal position, subsequent to being exposed to external forces, thus preserving both the optical and the light control properties of the screen.

In order to provide for these important properties of this screen and all other screens having similar properties, I provide a novel arrangement for retaining the end portions of screen 12 in a substantially straight unbent position within longitudinal recess 16. This arrangement comprises essentially a lacer-like retainer element, a preferred embodiment of which is indicated generally at 31. This lacer-like retainer element of the preferred form shown in Figs. 2 to 4 is preferably made of wire formed into a sinuous shape as by running a wire through a pair of gears to provide mid-portions 32 for introduction between two of the ribbon-like filler wires 22, and in between pairs of the longitudinally extending warp wires 21, with outwardly protruding portions 33 extending on alternate sides of screen 12 for engagement with complementary portions of frame 11 as will appear. Longitudinal grooves are formed in frame members 13 and 14 on each side of screen 12 within recess 16 to define shoulders 41 for cooperation with the protruding portions 33 of retainer 31.

The screen disclosed is preferably installed under a tension of about one-fourth of an inch elongation to the foot. In assembly the retainer member 31 is installed in the position it is to occupy in the screen by passing the same in from one side of the screen, and the screen stretched by suitable means until the protuberances 33 on one side are brought into alignment with the shoulder 41, whereupon closure strip 14 is placed in position and fastened in place by means of screws 15. It is of course to be understood that the other end of screen 12 has previously been similarly fastened in the opposite frame member 11, which is of identical construction.

It will be apparent that the installation of the retainer 31 in position within the screen 12 becomes a very simple operation consisting merely in starting one end of member 31 at one side of screen 12, and effecting introduction of the remainder of retainer 31 by the operator running his finger rapidly along the retainer exerting only a very small pressure in the direction of the screen. It will be seen further that the tension load is taken at two spaced points along a ribbon filler wire between each of the pairs of longitudinally extending warp wires by virtue of double-crossing of the sinuous lacer-like retainer. In other words, there are two mid-portions 32 of lacer or retainer 31 between each pair of longitudinally extending warp wires. I have shown the mid-portions 32 of retainer 31 spaced from each pair of warp wires about one-third the distance between adjacent warp wires and prefer this arrangement because of the satisfactory results that I have obtained. However, it will appear that this spacing may be varied within scope of my invention.

It is important to note in connection with the particular material illustrated that by virtue of the integrating twist 23 it is possible to position retainer member 31 no further than two flat ribbon wires from the end of the material with complete assurance that the cloth will withstand the tension to which it is subjected.

It is also important to note that in each of the modifications shown in Figs. 2 through 10, the only connection between the end portion of the screen and the frame effective to retain the screen, is through a medium of the lacer-like element. It is not found necessary in my arrangement to bend or otherwise distort the end portion of the screen around or in conformity with surfaces of the frame or about a filler member, the surfaces of which meet each other at relatively large angles, such for example, as the arrangement disclosed in the expired patents to Steely 885,097 or the expired patent to Burrowes 1,120,686. In each of the modifications of my arrangement shown in the above referred to figures, it will be seen that only a very short length of material need extend beyond the lacer-like element and this extended portion of material is substantially free to adjust itself about the lacer element as a fulcrum or axis in response to any movement that takes place in the main body of the screen as for example when the screen is subjected to a moving force such as a blow. This facilitates the return of the component parts of the screen to their normal position, thus preserving both the light and optical qualities of the screen.

As will appear from the following description, many different forms of frame structure as well as forms of retainer members may be employed within the teachings of my invention, only a limited number of which are illustrated for the purpose of this disclosure. Whatever specific constructions are employed, it is important to remember that there must be provided a frame member formed with an inwardly extending recess for receiving the edge of the screen without substantially bending or otherwise distorting the same, and means for retaining the peripheral edge of the screen within the recess under tension, this latter means preferably including some form of lacer-like element protruding between the interstices of the screen material and engaging shoulder-like surfaces formed on the frame within the recess.

In Fig. 5 there is shown a single piece end frame member 51 having inwardly extending elongated recess 52 therein for receiving the peripheral edge of the cloth and communicating side channels defining shoulders 53 for cooperation with the lacer retainer.

In Fig. 6 there is shown a metal frame member 55 of rectangular cross-section formed in one side with elongated opening 56 for the introduction of screen 12, the underside of the wall portions adjacent the opening 56 defining shoulders 57 for engagement by the lacer retainer.

Another alternative form of my invention is shown in Fig. 7, in which the frame member is composed of a main body portion 61 having a generally rectangular lower section 62 and an upper inwardly extending channel-like section 63 and a closure plate 64, attached to the body portion 62 as by screws 65. A filler member of channel-like shape 66 is received within channel-like portion 63 of main body 61, and screen 12 is inserted between closure plate 64 with the lacer engaged between the inner wall of channel 63 and filler member 66. It will be noted that in this form of construction the lacer-like retainer is restrained against movement in response to pull on the screen 12 on one side of the retainer only.

Turning to Fig. 8, there is illustrated a form of construction similar to that shown in Fig. 6, except that there is provided an insulator member 69 interposed between the channel frame member, the screen and associated retainer. This member functions to insulate against the transmission of electrical current between the frame member and the screen, as well as affording additional resilience.

In Fig. 9 I have shown another preferred form of retainer member preferably comprising a stamping 71 of suitable sheet metal material and formed with protuberances 72 adapted to extend through the interstice of the screen and engaging suitable shoulders provided on the embracing end frame for cooperation therewith. This form of lacer-like retainer will occupy a position corresponding to that occupied by previously described lacer retainer 31.

There is shown in Fig. 10 still another form of lacer-like retainer which is in the form of a spiral wire 75 introduced into the end portion of the screen by rotating the spiral in a manner to threadably introduce the same into position. The screen is retained within a channel member corresponding to that shown in the Fig. 6 by engagement of the convolutions of the wire with the the sides or shoulders adjacent the elongated slot on opposite sides of the screen in much the same manner as described in connection with the preceding figures.

In Fig. 11 there is shown a frame and screen assembly similar to that of Fig. 10 wherein the stamped lacer element 71 of Fig. 9 is substituted for the sinuous lacer 31 of Fig. 6 and the coiled wire lacer 75 of Fig. 10.

While I have described my invention in connection with certain specific embodiments thereof, it is to be understood that I do not desire to be limited thereby except as indicated by the appended claims which should be construed as broadly as the prior art will permit.

I claim:

1. A window screen and frame assembly including a piece of longitudinally resilient screen composed of a plurality of pairs of longitudinally extending warp wires and a plurality of parallel ribbon-like filler wires disposed with their major surfaces at a predetermined angle to the normal plane of the screen and held in position by integrating twists between said warp wires, end frame members for holding the end portions of said screen under tension, said frame members each being formed with an elongated recess opening in the direction of the mid-portion of said screen, and lacer-like retainer means passing through the interstices defined between an adjacent pair of said parallel ribbon-like filler wires and engaging said end frame members within said recesses for retaining said end portions of said screen therein under tension while maintaining the same substantially in the normal plane of said screen.

2. A window screen assembly including a piece of longitudinally resilient screen composed of a plurality of pairs of longitudinally extending warp wires and a plurality of parallel ribbon-like filler wires disposed with their major surfaces at a predetermined angle to the normal plane of the screen and held in position by integrating twists between said warp wires, end frame members for supporting and holding the end portions of said screen under tension, said frame members being formed respectively with an elongated recess opening in the direction of the mid-portion of said screen, the end portions of said screen being positioned substantially straight within said recesses, with said end portions substantially in the normal plane of said screen and lacer-like retainer means passing through the interstices of said end portions of said screen defined by an adjacent pair of said parallel ribbon-like filler wires, said end frame members being provided with shoulders within said elongated recesses facing away from the central portion of said screen and cooperating with said retainer means on each side of said screen for retaining said end portions within said end frame members under tension while maintaining the same substantially in the normal plane of said screen, the only retaining connection between said screen and said frame being that through the medium of said lacer-like retainer.

3. The combination with the end portion of a piece of screen composed in part of an adjacent pair of parallel ribbon-like wires, of a hollow frame member for receiving said end portion and a lacer-like retainer for preventing the withdrawal of said end portion from said frame, said lacer-like retainer being in the form of a sinuous wire, the crest portions of said wire extending beyond the sides of said screen and engaging said frame member while the portions of said wire joining said crest portions are received between said adjacent pair of said ribbon-like wires for retaining the same within said frame member.

4. In a frame and retaining assembly for screens having longitudinal resiliency, end frame members each having an elongated channel formed therein and an elongated slot of reduced size opening through the wall of said frame member in the plane of said screen, the end portions of said screen being positioned substantially straight within said recesses while retaining said end portions substantially in the normal plane of said screen under tension, and a helical coil of wire threaded into the end portion of said screen having the portions thereof protruding beyond the sides of said screen engaging said end frame member within said elongated slots whereby to retain said end portions within said end frame members under tension.

5. In a screen assembly including a piece of longitudinally resilient screen composed of a plurality of pairs of longitudinally extending warp wires and a plurality of parallel ribbon-like filler wires disposed with their major surfaces at a predetermined angle to the normal plane of the screen and held in position by integrating twists between said warp wires, top and bottom frame members for supporting and holding the end portions of said screen under a predetermined tension, said frame members being formed respectively with an elongated recess opening in the direction of the screen, the end portions of said screen being positioned substantially straight within said recesses and substantially in the normal plane of said screen and lacer-like retainer means passing through the interstices of said end portion of said screen defined by an adjacent pair of said parallel ribbon-like filler wires and said warp wires, said end frame members being provided with shoulder portions within said elongated recesses facing generally away from the screen and cooperating with said lacer-like retainer means on each side of said screen for retaining said end portion within said end frame members under a predetermined tension while maintaining the same substantially in the normal plane of said screen, said lacer-like retainer means comprising a wire having a general serpentine, S-shape, the alternate crest portions of said retainer wire being arranged to be introduced between pairs of said warp wires for engagement with the shoulder portions on one side of said screen while the intervening crest portions are arranged for engagement with the shoulder portions of said frame on the opposite side of said screen, said retainer wire being disposed substantially in a plane normal to the plane of said fabric.

6. The combination with the end portion of a piece of screen composed in part of an adjacent pair of parallel ribbon-like members, of a hollow frame member for receiving said end portion and a lacer-like retainer comprising a sheet metal stamping including a main body portion from which extends a plurality of spaced finger-like protuberances adapted to pass between said adjacent pair of parallel ribbon-like wires for engaging said frame member for retaining said end portion of said screen within said frame member.

7. In a window screen and frame assembly including a piece of screen composed of a plurality of symmetrically spaced horizontally extending parallel ribbon-like elements disposed with their major surfaces at a predetermined angle to the normal plane of the screen and including a plurality of horizontally spaced, longitudinally extending supporting elements extending between said parallel ribbon-like members, end frame members for firmly holding said end portions of said screen, said frame members each being formed with a longitudinally extending recess having an entry opening facing in the direction of the mid-portion of said screen for receiving one of said end portions of said screen, and lacer-like retainer means having protuberant portions extending through the interstices defined between an adjacent pair of said ribbon-like members and said longitudinally extending supporting elements, said lacer-like retainer means engaging said screen members within said recesses for retaining said end portions of said screen therein while maintaining said end portions substantially in the normal plane of said screen.

8. The combination with the end portion of a piece of screen composed in part of adjacent spaced parallel ribbon-like members disposed at a predetermined angle with reference to the general plane of the screen and having horizontally spaced generally vertically extending supporting elements for holding said ribbon-like members in said relationship, of a hollow frame member for receiving said end portion and lacer-like retainer means for preventing the withdrawal of said end portion from within said hollow frame, said lacer-like retainer comprising a sinuous wire, the crest portions of said wire extending beyond the sides of said screen and engaging said frame member within said hollow portion, the portions of said wire joining said crest portions being received between adjacent ones of said parallel ribbon-like members and said longitudinally extending supporting members for retaining said end portion within said hollow frame member.

WALKLEY B. EWING.